US006633367B2

(12) United States Patent
Gogolla (10) Patent No.: US 6,633,367 B2
(45) Date of Patent: Oct. 14, 2003

(54) METHOD AND DEVICE FOR OPTOELECTRONIC DISTANCE MEASUREMENT

(75) Inventor: Torsten Gogolla, Frastanz (AT)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/767,447

(22) Filed: Jan. 23, 2001

(65) Prior Publication Data
US 2001/0013929 A1 Aug. 16, 2001

(30) Foreign Application Priority Data
Feb. 14, 2000 (DE) .......................................... 100 06 493

(51) Int. Cl.$^7$ ............................. G01C 3/08; G01S 13/08
(52) U.S. Cl. ...................................... 356/5.15; 342/342
(58) Field of Search ......................... 356/5.15; 342/127

(56) References Cited

U.S. PATENT DOCUMENTS

| 4,403,857 A | * | 9/1983 | Holscher |
| 4,531,833 A |   | 7/1985 | Ohtomo |
| 5,082,364 A | * | 1/1992 | Russell |

FOREIGN PATENT DOCUMENTS

| DE | 4328555 | 3/1984 |
| DE | 4002356 | 10/1996 |
| EP | 0475326 | 3/1992 |
| EP | 0503600 | 9/1992 |

* cited by examiner

Primary Examiner—Stephen C. Buczinski
(74) Attorney, Agent, or Firm—Sidley Austin Brown & Wood, LLP (57) ABSTRACT

The invention is directed to a method for optoelectronic distance measurement and a measurement device based on this method, in which two light emitters, particularly laser emitters and two photodiode receivers are used for calibration. Part of the modulated output of the main emitter reaches the measurement object and then arrives at the main photoreceiver in the form of scattered light and another part of the output of the main emitter travels directly to a reference photoreceiver, while a part of the modulated output of the reference light emitter is guided directly to the main photoreceiver and another part is guided directly to the reference photoreceiver. According to the invention, the light intensities of the main emitter and the reference emitter are simultaneously modulated with different modulation frequencies ($f_1$, $f_2$), and a signal mixture is formed in the main receiver as well as in the reference receiver, which signal mixture contains a signal with the intensity modulation frequency ($f_1$) of the main emitter and a signal with the intensity modulation frequency ($f_2$) of the reference emitter. The phases of the two signals of the signal mixture are measured simultaneously and the separation of the two phases is carried out by the different frequencies in a subordinate intermediate frequency range and by the different intensity modulation frequencies. At least two sequential measurement processes are preferably carried out, wherein the intensity modulation frequencies of the reference emitter and main emitter are exchanged in the second measurement process. Phase errors depending upon temperature, aging and reception power can be entirely eliminated by the invention in electro-optic distance measuring devices.

29 Claims, 2 Drawing Sheets

METHOD AND DEVICE FOR OPTOELECTRONIC DISTANCE MEASUREMENT

FIELD OF THE INVENTION

The invention is directed to a device and method for optoelectronic distance measurement, wherein an intensity-modulated main light beam emitted by a main light emitter is directed to a measurement object at a distance, wherein the distance ($D_0$) of a measurement object from an observation point is to be measured, and a light scattered at the observation point reaches a main photoreceiver via reception optics, and a branched part of the main light beam is simultaneously directed to a reference photoreceiver via a first known reference distance ($D_1$), an intensity-modulated reference light beam emitted by a reference light emitter reaches the reference photoreceiver via a second known reference distance ($D_2$), and a part of the reference light beam reaches the main photoreceiver via a third reference distance ($D_3$), and wherein the signals delivered by the main photoreceiver and the reference photoreceiver are subjected to a comparative signal evaluation for obtaining a corrected measurement signal, wherein the light intensities of the main emitter and the reference emitter are simultaneously intensity-modulated at different frequencies, wherein the signal mixtures supplied by the main receiver and the reference receiver, each of the signal mixtures contains a signal component with the intensity modulation frequency of the main emitter and a signal component with the intensity modulation frequency of the reference receiver, are converted to an intermediate frequency range containing two frequency components, wherein one frequency component is formed by the signal of the reference emitter and the other frequency component is formed by the signal of the main emitter, and the separation of the phase information contained in the two simultaneously occurring intermediate frequency signals is based on the different frequencies in the intermediate frequency range and the different modulation frequencies for the intensity modulation of the main light beam and reference light beam for purposes of comparative signal evaluation.

BACKGROUND OF THE INVENTION

Optoelectronic measurements of distances up to 100 m with accuracy within a few millimeters have gained importance for numerous applications, particularly in the construction and the plant engineering industries. Such distance measurement systems should be as dynamic as possible making it possible to process very weak signals as well as strong signals. Such measurement systems render superfluous the use of defined target marks on the object whose distance from an observation point is to be determined. The possibility of direct distance measurement at determined surfaces, i.e., without the use of target marks, makes possible reduced manufacturing times and cost savings accompanied by lower manufacturing tolerances, particularly in the industries mentioned above.

Processes and devices for accurate optoelectronic distance measurement are known. In most cases, as well as in the case of the invention, a preferably sine-shaped intensity-modulated beam from a light source, particularly a laser diode, is directed onto an object to be measured. The intensity-modulated light, which is backscattered by this measurement object, is detected by a photodiode. The distance to be measured is given by the phase shift of the sinusoidal modulated light intensity backscattered from the measurement object in relation to the emitted light intensity from the light source.

A principal difficulty in high-precision distance and phase measurement systems of the type mentioned above is the elimination of temperature-dependent and aging-dependent parasitic phase changes in the light source, that is, particularly in the laser diode transmitter and in the photodiode receiver. Various methods are known for countering this difficulty.

One possibility, described in EP 0 701 702 B1, is to use a mechanically switchable reference distance. In this case, an intensity-modulated laser beam is initially directed, in a first measurement, to the measurement object and then, in a second reference distance measurement, is guided directly to the photoreceiver via a tiltable mirror. The influences of temperature and aging on the structural component parts are eliminated by subtracting the measured phases. However, since widely varying optical reception power must be expected with alternating distance and reference distance measurement, a measurement error arising in this way is not eliminated. Another substantial disadvantage of this concept is the use of moving mechanical components, which limit the reliability and service life of the entire measurement system.

Other known distance measurement devices of the type under discussion, which are described in DE 196 43 287 A1, work with a reference photoreceiver and a main photoreceiver. In this case, a part of the intensity-modulated laser light is directed to the measurement object and then to the main photoreceiver and another part which is divided from the laser light beam is guided directly to the reference photoreceiver. No moving mechanical switch is required since the reference photoreceiver is constantly illuminated during measurement. However, in this concept, while the phase response of the laser diode transmitter is eliminated, the phase behavior of the reception components which change over time and are generally different for the measurement arm and reference measurement arm are not eliminated. Further, in distance measurement devices of this type, sharply different reception power in the two arms resulting in further phase errors must also be taken into account.

In another known optoelectronic distance measurement device (see U.S. Pat. No. 4,403,857), two laser emitters and two photodiode receivers are used to eliminate the above-mentioned phase errors. In this device, a portion of the intensity-modulated output of a main light emitter is guided directly onto the measurement object, from which it arrives at the main photoreceiver as scattered light. Another portion of this transmitted output is guided via an exact known first reference distance to a reference photoreceiver. Further, there is a reference light emitter whose delivered output is likewise intensity-modulated and a portion of which reaches the main photoreceiver via a second reference distance, while another portion is guided directly to the reference photoreceiver via a third reference distance.

The main light emitter and the reference light emitter are activated successively via an electronic changeover switch. This measurement principle requires no mechanical changeover switch. In addition, phase changes caused by temperature and aging are completely eliminated in the transmitting unit as well as in the reception unit. However, since substantial differences in reception power must be taken into account in measurements with the signals of the main light emitter and reference light emitter, the phase errors resulting from this are also not eliminated in the concept upon which this known distance measurement device is based. Phase errors depending on reception power are particularly noticeable with avalanche photodiodes (APD) which are preferred as main receivers because of other advantages. At high amplifications, saturation effects gradually come about as output increases, so that avalanche gain is dependent on the received output. Therefore, there occurs, in addition, an output-dependent phase rotation in the case of reception of high-frequency-modulated optic radiation. Further, the generated charge in the barrier layer of the APD varies with the reception power, so that barrier layer distance as well as barrier layer capacity are influenced. As the barrier layer capacity changes, so does the phase behavior of the low-pass formed by it. With high APD gain factors, a phase rotation of greater than 5°, as a rule, can be brought about in this way with a reception power variation of two orders of magnitude.

SUMMARY OF THE INVENTION

It is thus the object of the invention to provide a distance measurement method and a device operating by this method by which a highly accurate distance measurement can be achieved and which is completely independent from phase errors depending on temperature, aging and reception power. Mechanical or electronic changeover switches are dispensed with and the total measuring time for obtaining reliable measurement results is appreciably reduced.

In a method for optoelectronic distance measurement according to the invention, the invention is characterized in that the light intensities of the main emitter and reference emitter are modulated simultaneously at different frequencies, wherein the signal mixtures supplied by the main receiver and reference receiver, each of which signal mixtures contains a signal component with the intensity modulation frequency of the main emitter as well as a signal component with the intensity modulation frequency of the reference emitter, are converted to an intermediate frequency range containing two frequency components, wherein one frequency component is formed by the signal of the reference emitter and the other frequency component is formed by the signal of the main emitter, and in that the separation of the phase information contained in the two simultaneously occurring intermediate frequency signals is carried out based on the different frequencies in the intermediate frequency range and the different modulation frequency for the intensity modulation of the main beam and reference beam for purposes of comparative signal evaluation.

Advantageous further developments of this distance measurement method according to the invention are defined in the dependent patent claims.

A device according to the invention for optoelectronic distance measurement with the features of the invention is characterized, according to the invention, by a device by which the light beams emitted by the main emitter and by the reference emitter can be intensity-modulated simultaneously with different frequencies in each instance.

Advantageous constructions of this distance measurement device according to the invention are likewise defined in further dependent patent claims.

In a manner similar to the distance measurement process described in U.S. Pat. No. 4,403,857, two light transmitters, particularly lasers, and two photodiode receivers are used in the present invention. However, according to the invention, in contrast to this known method, the light of the first light transmitter, designated as main emitter, which is preferably sinusoidal intensity-modulated by a first modulation frequency $f_1$, is directed to the surface of a measurement object. The light which is backscattered from the measurement object and which is likewise intensity-modulated reaches the second photoreceiver, designated as main receiver, for example, via reception optics. At the same time, a portion of the modulated light of the main emitter is guided directly via a first reference distance to the second photoreceiver, designated as reference receiver. The reference emitter is intensity-modulated, likewise preferably in sinusoidal manner, with a second modulation frequency. A portion of its modulated optical beam reaches the main receiver via a second, known reference distance and particularly via a scattering medium, while another component of its modulated optical beam arrives at the reference receiver via a third reference distance.

The two receivers are simultaneously acted upon by the two emitter signals, so that, in contrast to the distance measurement method described in U.S. Pat. No. 4,403,857, no changeover switch is required and the measurement time is appreciably reduced. The photoreceivers convert the detected modulated optical outputs into photocurrents, which are subsequently converted into voltages, preferably, by transimpedance amplifiers.

The two signal voltages obtained in this manner are subsequently converted by associated mixers into suitable intermediate frequency ranges using a locally generated frequency and are then evaluated after analog-to-digital conversion of a signal evaluation for error-free determination of the phase shift caused by the signal rise time or transit time and accordingly for determining the distance.

BRIEF DESCRIPTION OF DRAWINGS

The invention and advantageous details are explained more fully in the following with reference to the drawings.

DETAILED DESCRIPTION OF THE INVENTION

Figure 1:
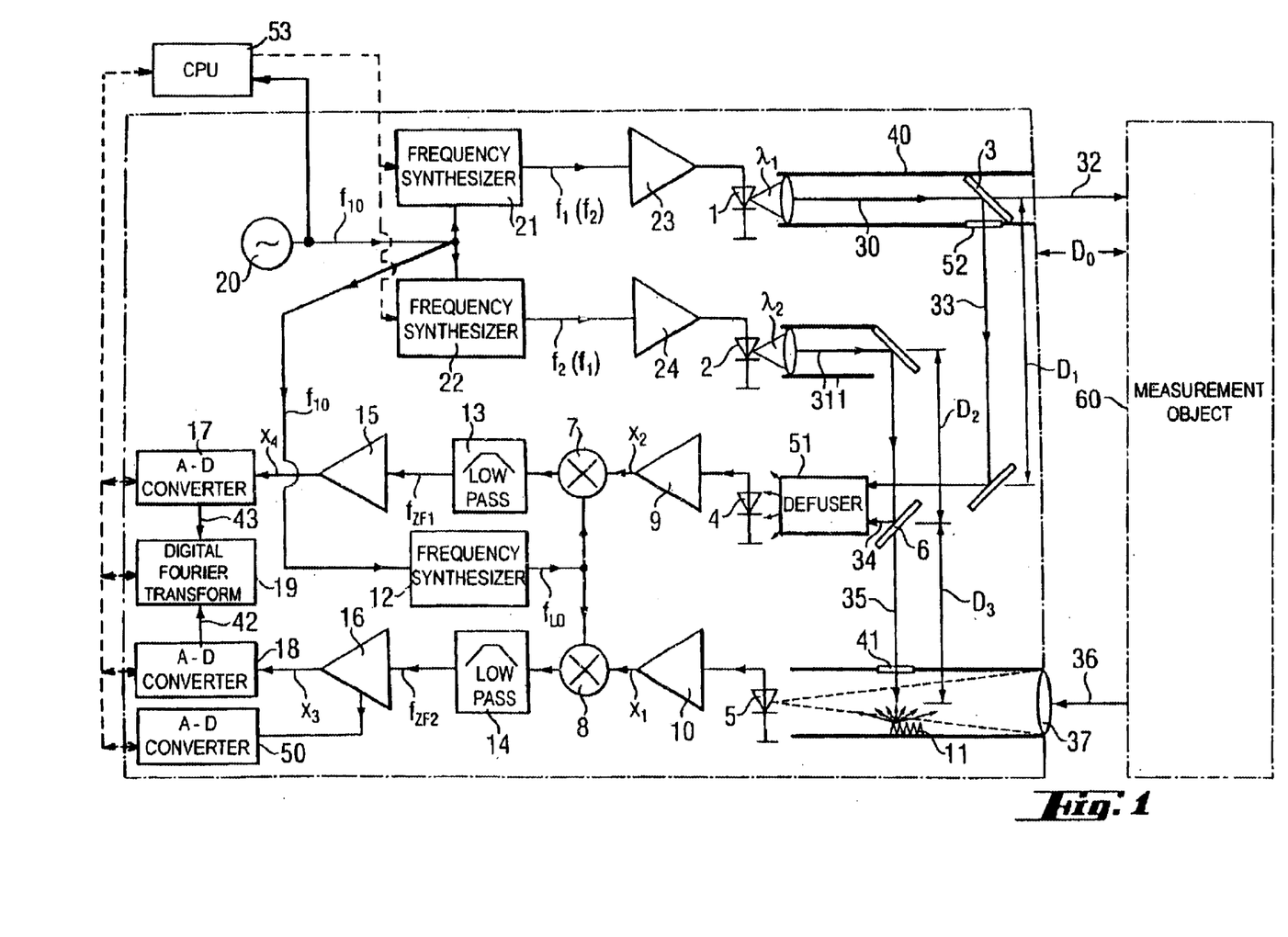
FIG. 1 shows a schematic view of a preferred construction of a distance measurement device used to practice a method in accordance with the invention.

The basic arrangement of a distance measurement device operating by the method according to the invention contains a first light transmitter, particularly a laser, designated as main emitter 1, a second light transmitter, particularly a laser, designated as reference emitter 2, a first photoreceiver, designated as reference receiver 4, and a second photoreceiver, designated as main receiver 5. The main emitter 1 can be a comparatively high-power edge-emitting laser diode (EEL) whose emission wavelength is, e.g., $\lambda_1$=650 nm, as is indicated in the drawing. A laser diode which preferably radiates at a different wavelength, for example, $\lambda_2$=850 nm, e.g., a VCSEL (Vertical Cavity Emitting Laser Diode), is used as a reference emitter 2. The choice of different wavelengths for the main emitter and reference emitter make optic filtering possible, explained in more detail below, so that problems due to optical crosstalk can be reduced. A PIN photodiode is preferably used as reference receiver 4, while an avalanche photodiode is preferably provided as main receiver 5.

The idea of modulating the intensity of the radiation output emitted by the main emitter 1 and reference emitter 2, respectively, at a determined measurement time with different frequencies, preferably sinusoidal, as decisive importance for the invention. The centralized control of the measurement device, as is known by those skilled the art, is performed by a Central Processing Unit (CPU) 53. Accordingly, for example, the main emitter 1 is intensity-modulated (initially) at frequency $f_1$ and the reference emitter 2 is intensity-modulated (initially) at frequency $f_2$. The two modulation frequencies $f_1$, $f_2$ are obtained via two frequency synthesizers 21 and 22 controlled by a common oscillator 20. The switching of the division ratios of the frequency synthesizer 21, 22 is synchronized by a program sequence of CPU 53. The synchronization of the program run of CPU 53 is clocked by the local oscillator 20. The modulation signals with frequencies $f_1$ and $f_2$, respectively, are supplied to an exciter circuit (not shown) for the main emitter 1 and reference emitter 2, e.g., by high-frequency amplifiers 23 and 24, respectively.

The bundled main ii ht beam 30 which is emitted by the main emitter 1 and, for example, guided in a tube 40, first reaches a beam splitter 3, which splits the main light beam 30 into two components, namely, a main component 32 directed to the measurement object 60, and a branched component 33, which reaches the reference receiver 4 via a first known reference distance $D_1$ with the intermediary of diffuser 51 or scatterer. A homogeneous modulation phase distribution in the beam cross section before the reference receiver 4 is ensured by the diffuser 51 or scatterer. A semitransparent mirror, a prism, a glass plate, an integrated-optic beam splitter, a diffractive element, e.g., a hologram or the like, can be provided as beam splitter 3. However, it should be emphasize that the beams of the reference distances need not necessarily be collimated or deflected by beam splitters. Alternatively, for example, volume scattering or direct illumination oft receiver, e.g., by means of a diffuser, can be provided. The component 36 of the measurement beam 32 which is backscattered from the measurement object 60 located at a distance arrives at the main receiver 5 via collecting optics 37. The reference light beam 31 which is emitted by the reference emitter 2 and which is generally collimated is split into two components by means of a beam splitter 6, wherein a first component 34 arrives at the reference receiver 4 via a second reference distance $D_2$ and a diffuser or the diffuser 51 or scatterer, while a second component 35 is initially supplied, via a third reference distance $D_3$, preferably via an optic filter 41 tuned to the wavelength of the reference emitter, to a scattering medium (scatterer) 11 and then, as scattered component, together with the component 36 of the main light beam that is backscattered from the measurement object 60, is applied to the main receiver 5. In principle, any scattering material can be used as scatterer 11. Even the housing wall would be suitable. However, in order to monitor the scatter light output of the reference emitter light, the degree of scatter of the scattering material should be adapted to the reception system. Since an intensive output damping of the reference emitter beam 35 is aimed for in view of the generally weak measurement signals, a scattering material with a low degree of scatter, e.g., black paper, black velvet or the like, is advantageous least with respect to the main emitter 5.

The use of the scatterer 11, which is very advantageous in connection with the invention, is based on the following observation: The modulation phase is not homogeneous in the beam cross section of laser diodes, i.e., different points of the beam cross section have different phases with respect to the modulated light intensity. With homogeneous backscattering, a phase averaged over the beam cross section is measured. However, in the event that determined regions of the beam are cut out or masked by the surface of the measurement object 60, e.g., when one portion of he light spot impinges on black, absorbent regions and another portion impinges on white, highly backscattering regions of the surface of the measurement object 60, the average phase changes and a measurement error occurs depending on the unknown surface of the measurement object 60. This error cannot be compensated. In most cases, however, all points of the light spot are backscattered with virtually the same intensity.

If a reference emitter beam 35 is guided directly to the main receiver 5, only a small portion of the beam cross section would be detected because of the small APD surface. The phase of the beam measured in this way generally does not represent the average modulation phase. In addition, the phase distribution in the beam cross section is not constant over time and, moreover, depends on the temperature. By using the scatterer 11, it is ensured that signal components are detected from all points of the beam cross section. Therefore, an average phase is measured which has a more constant behavior than a point phase. Errors occurring due to point measurement of the phase of the reference emitter beam 35 are reduced by the scatterer 11.

In order to prevent such phase errors, it may also be advantageous to guide the beams 33 and 34 via a scatterer, e.g., the diffuser 51, before the modulated light is detected by the reference receiver 4.

It is another object of the scatterer 11 to effect a strong output damping of the reference emitter light. Because of the very weak measurement signals, the reception system is very sensitive. The output damping prevents overloading of the APD in the main receiver 5. Moreover, the shot noise which increases with the detected light output is reduced in this way.

It is important to adapt the scatter output of the reference emitter light to the system so that an optimal signal-to-noise ratio (SNR) is achieved. If the scatter light output is too high, extensive shot noise must be taken into account and, therefore, with weak measurement signals, a poor SNR should be expected when determining the phase of the measurement signal. On the other hand, when scatter light outputs are too low, the SNR is poor when determining the phase of the reference emitter signal. Since this phase is also included in the distance measurement, a measurement error can result. Thus, it is advisable to find a suitable compromise. For a distance measurement range of up to 100 m, tests have shown that the detected scatter light output of the reference emitter beam 35 should be approximately equal to an output of the measurement beam 36 which is backscattered from a distance of 15 m. In this instance, a backscattering coefficient of the measurement object 60 surface of 0.5 and homogeneous backscattering are assumed. At an output of the measurement beam 32 of 1 mW and a diameter of the reception optics 37 of 50 mm, this corresponds to a detected scatter light output of the reference emitter beam of 0.7 nW.

The photocurrents supplied by the reference receiver 4 and main receiver 5 are initially converted into corresponding measurement voltages $x_2$ and $x_1$ via transimpedance amplifiers 9 and 10.

In principle, impedance-monitored (50-Ohm) HF-output amplifiers can be used instead of the transimpedance amplifiers. However, as a rule, such impedance-monitored HF-output amplifiers have inferior noise characteristics and lower gain. It may be useful, however, at least for cost reasons, to employ an impedance-monitored HF-output amplifier for the reference arm instead of the transimpedance amplifier 9, wherein a strong signal can be achieved with lower current consumption.

The signal $x_2$ originating from the reference receiver 4 is then applied to a measurement signal input of a first mixer 7, while signal $x_1$ arrives at the measurement signal input of a second mixer 8. The two mixers 7 and 8 are controlled by the same local frequency oscillator 20 (mother oscillator) via frequency synthesizer 12 with a frequency $f_{LO}$ which is selected in such a way that there is a signal mixture with frequency components $f_{ZF1}$ and $f_{ZF2}$ also in the intermediate frequency range occurring on the output side. In this case, it is important that the modulation frequencies of the main emitter 1 and reference emitter 2 are different and that the main receiver 5 and reference receiver 4 both supply a signal mixture comprising two signals with frequencies $f_1$ and $f_2$. This signal mixture is converted in both signal arms with, as a rule, identically constructed mixers 7 and 8 and the local oscillator signal of the frequency $f_{LO}$ in the above-mentioned intermediate frequency range. Also, direct mixing via avalanche photodiodes (APD) is possible in this connection, wherein the signal of the local oscillator 12 is superimposed directly on the APD operating high voltage. This local oscillator signal is mixed with the reception signal by the resulting modulation of the avalanche gain, so that the APD output current contains both intermediate frequency signal components $f_{ZF1}$ and $f_{ZF2}$. The high-frequency amplifier and high-frequency mixer can accordingly be dispensed with. In this case, however, avalanche photodiodes are to be used for the reference arm as well as for the measurement arm. The first intermediate frequency signal with frequency $f_{ZF1}$ is subsequently derived from the reception signal with the first modulation frequency $f_1$ and the intermediate frequency signal with the second intermediate frequency $f_{ZF2}$ is derived from the reception signal with the second modulation frequency $f_2$. After low-pass filtering 13 and 14 for eliminating the signal components with sum frequencies $f_1+f_{LO}$ and $f_2+f_{LO}$ and for noise signal reduction and gain 15 and 16, the suitably amplified intermediate frequency signals $x_4$ and $x_3$ are sampled by analog-to-digital converters 17 and 18. The CPU 53 controls the synchronization of the sampling of the IF signals by the analog-to-digital converters 17, 18, i.e., the start of the measuring sequence and the initialization of the individual sampling steps. The path from CPU 53 to the analog-to digital converters 17, 18 provides the start signal for the entire measuring sequence and the initialization of the individual sampling steps and the path from the analog-to-digital converters 17, 18 to CPU 53 provide the signal flow of the sampling values. The control for analog-to-digital converter 50 is also initialized by CPU 53 and the generated sampling values are transferred to CPU 53 from analog-to-digital converter 50.

In practice the first and second intermediate frequencies $f_{ZF1}$ and $f_{ZF2}$ and the sampling time of the analog-to-digital converters 17, 18, that is, the measurement window, are advisably selected in such a way that an integral number of cycles of the two intermediate frequency signals $f_{ZF1}$, $f_{ZF2}$ lie in the measurement window of the digital sampling. This selection prevents a leakage effect, as it is called, which occurs in the digital, discrete Fourier transform (DFT) when the frequency components do not lie in the frequency raster of the DFT; e.g., 40 kHz and 60 kHz for a 1-kHz frequency raster, i.e., the spacing of the discrete frequency values is 1 kHz and the associated measurement window is 1/1 kHz=1 ms.

A digital Fourier transform (DFT) 19 of the sampled signal mixture $x_3$ of the main receiver arm 42 and, independent from this, of the sampled signal mixture $x_4$ of the reference receiver arm 43, e.g., for a determined measurement window as indicated above, supplies the phases of the light signal components 33 and 36 of the main emitter 1, the phases of the light signal components 34 and 35 of the reference emitter 2, and phase shifts which are dependent upon temperature, aging, and reception power and which are brought about in the main receiver arm and reference receiver arm. Accordingly, four phase relationships are determined. The DFT19 is realized by software usually within a program routine of CPU 53. Since the calculation of the Fourier transform is synchronized with the program run (i.e., supply of sampling values for the Fourier transform function, start of calculation, and output of the results of the Fourier transform 19), a bi-directional path of data runs between CPU 53 and DFT 19.

Since the phase can only be definitely measured in an interval of 0 to $2\pi$, but the measurement distance produces substantially greater phase shifts in most cases, the modulation frequencies are changed in a second measurement pass, i.e., the main emitter 1 is now sinusoidal intensity-modulated with frequency $f_2$ and the reference emitter 2 is sinusoidal intensity-modulated with frequency $f_1$, according to a significant improvement, in accordance with the invention for achieving a definite distance measurement and for improving the measurement results. The measurement process described above is repeated with these new settings so that four further phases result for the sampled signal mixtures in the main receiver arm and reference receiver arm for these new settings.

Since the signal of the main emitter 1 and the signal of the reference emitter 2 in the arm of the main receiver 5 and in the arm of the reference receiver 4 traverse the same components, as was shown, the phase behavior of the respective receiver components is completely eliminated by phase subtraction with respect to the signal phases measured in the main reception arm 42 and in the reference reception arm 43. Moreover, the reception ratios are constant, since the main emitter signals and reference emitter signals simultaneously pass the respective reception arms. As was also shown, the separation of the signals is carried out via the different modulation frequencies $f_1$ and $f_2$. Phase errors depending on reception power are accordingly likewise eliminated.

By additional subtraction of phase differences, the phase behavior of the main emitter 1 and the phase behavior of the reference emitter 2 are eliminated in addition, so that there finally remains only a constant phase difference which is formed by the indicated path differences of reference distances $D_1$, $D_2$ and $D_3$ internal to the device and by the measurement distance $D_0$ (not shown in more detail in FIG. 1) of the two emitter signals outside the two laser emitters. The measurement distance $D_0$ influences the phase of the modulated light component 32 of the main emitter 1 detected by the main receiver 5, reference distance $D_1$ influences the phase of the modulated light component 33 of the main emitter 1 detected by the reference receiver, reference distance $D_2$ influences the phase of the modulated light component 34 of the reference emitter 2 detected by the reference receiver, and reference distance $D_3$ influences the phase of the modulated light component 35 of the reference emitter 2 detected by the reference receiver. Since the transit times internal to the device are known via reference distances $D_1$, $D_2$ and $D_3$ outside the emitters 1, 2 and are constant, the distance to be measured can be determined.

The distances are determined in accordance with the method of the invention completely independently from the phase behavior of the transmitting units and reception units.

Figure 2A:
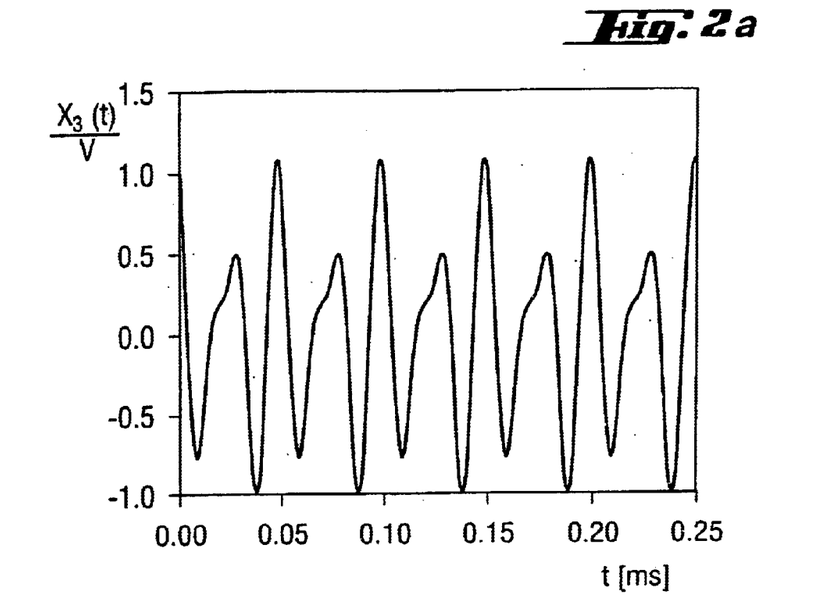
FIG. 2a shows a graphical representation of an intermediate frequency signal mixture obtained at the output of amplifier 16, of FIG. 1, in the time domain.
Figure 2B:
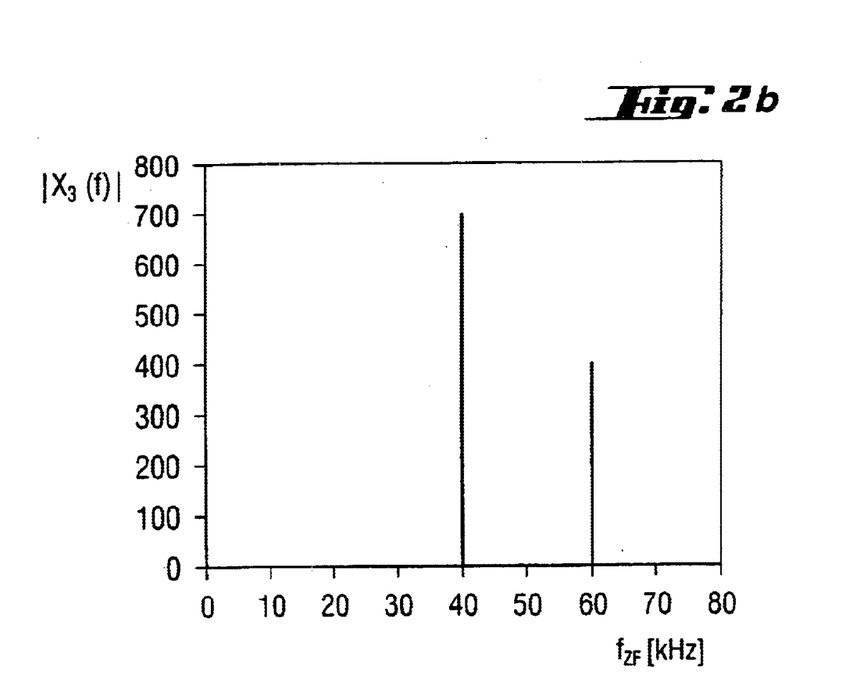
FIG. 2b shows a graphical representation of an intermediate frequency signal mixture obtained at the output of amplifier 16, of FIG. 1, in the frequency domain.

Phase difference averaging by means of Fourier transformation is explained in the following section. The basic shape of the intermediate frequency signals, which are sampled by the analog-to-digital converters 17 and 18, is shown in FIG. 2a. The signal mixture in the frequency domain is also shown in FIG. 2b.

Initially, the main emitter 1 emits radiation with modulation frequency $f_1$ and the reference emitter 2 emits radiation with modulation frequency $f_2$. Each mixer input signal $x_1$ and $x_2$ has two sine-shaped signal components with frequencies $f_1$ and $f_2$ of modulation.

Let:

$$x_1 = \hat{x}_{1,1} \cos(2f_1 t + \psi_{HS}(f_1) + \psi_{HE}(f_1) - 2f_1 2D_0/c) + \hat{x}_{1,2} \cos(2f_2 t + \psi_{RS}(f_2) + \psi_{HE}(f_2) - 2f_2 D_3/c) \quad (1)$$

$$x_2 = \hat{x}_{2,1} \cos(2f_1 t + \psi_{HS}(f_1) + \psi_{RE}(f_1) - 2f_1 D_2/c) + \hat{x}_{2,2} \cos(2f_2 t + \psi_{RS}(f_2) + \psi_{RE}(f_1) - 2f_2 D_2/c), \quad (2)$$

where

- $\psi_{HS}(f_1)$ is the sum of the initial phase of the synthesizer (21) and phase shift of the driver (23) and main emitter (1) at frequency $f_1$; temperature-dependent and aging-dependent;
- $\psi_{RS}(f_2)$ is the sum of the initial phase of the synthesizer (22) and phase shift of the driver (24) and reference emitter (2) at frequency $f_2$; temperature-dependent and aging-dependent;
- $\psi_{HE}(f_1)$ is the sum of the phase shift of the main receiver (5) and transimpedance amplifier (10) at frequency $f_1$; temperature-dependent and aging-dependent;
- $\psi_{HE}(f_2)$ is the sum of the phase shift of the main receiver (5) and transimpedance amplifier (10) at frequency $f_2$; temperature-dependent and aging-dependent;
- $\psi_{RE}(f_1)$ is the sum of the phase shift of the reference receiver (4) and transimpedance amplifier (9) at frequency $f_1$; temperature-dependent and aging-dependent;
- $\psi_{RE}(f_2)$ is the sum of the phase shift of the reference receiver (4) and transimpedance amplifier (9) at frequency $f_2$; temperature-dependent and aging-dependent;
- $D_0$ is the measurement distance;
- $D_1$ is the constant and known distance internal to the device;
- $D_2$ is the constant and known distance internal to the device;
- $D_3$ is the constant and known distance internal to the device;
- c is the light velocity in air.

By mixing (multiplying) the signals from equations (1) and (2) with the local oscillator signal of frequency $f_{LO}$ and subsequent low-pass filtration, $$x_3 = \hat{x}_{3,1} \cos(2f_{ZF1} t + \psi_{HS}$$
$$(f_1) + \psi_{HE}(f_1) + \psi_{ZF3}$$
$$(f_{ZF1}) - 2f_1 2D_0/c)$$
$$+ \hat{x}_{3,2} \cos(2f_{ZF2} t + \psi_{RS}$$
$$(f_2) + \psi_{HE}(f_2) + \psi_{ZF3}$$
$$(f_{ZF2}) - 2f_2 D_3/c) \quad (3)$$

$$x_4 = \hat{x}_{4,1} \cos(2f_{ZF1} t + \psi_{HS}$$
$$(f_1) + \psi_{RE}(f_1) + \psi_{ZR4}$$
$$(f_{ZF1}) - 2f_1 D_1/c)$$
$$+ \hat{x}_{2,2} \cos(2f_{ZF2} t + \psi_{RS}$$
$$(f_2) + \psi_{RE}(f_2) + \psi_{ZF4}$$
$$(f_{ZF2}) - 2f_2 D_2/c) \quad (4)$$

with the intermediate frequencies $$f_{ZF1} = |f_1 - f_{LO}| \quad (5)$$

and $$f_{ZF2} = |f_2 - f_{LO}| \quad (6).$$

By means of the low-pass filtration, the signal components with sum frequencies $f_1 + f_{LO}$ and $f_2 + f_{LO}$, which are also formed by the nonlinear mixing process, are eliminated. The noise level is also reduced in this way.

Let

- $\psi_{ZF3}(f_{ZF1})$ be the sum of the initial phase of the synthesizer (12), initial sampling phase of the ADC (18) and phase shift of the low-pass (14) and amplifier (16) at frequency $f_{ZF1}$;
- $\psi_{ZF3}(f_{ZF2})$ be the sum of the initial phase of the synthesizer (12), initial sampling phase of the ADC (18) and phase shift of the low-pass (14) and amplifier (16) at frequency $f_{ZF2}$;
- $\psi_{ZF4}(f_{ZF1})$ be the sum of the initial phase of the synthesizer (12), initial sampling phase of the ADC (17) and phase shift of the low-pass (13) and amplifier (15) at frequency $f_{ZF1}$;
- $\psi_{ZF4}(f_{ZF2})$ be the sum of the initial phase of the synthesizer (12), initial sampling phase of the ADC (17) and phase shift of the low-pass (13) and amplifier (15) at frequency $f_{ZF2}$.

The intermediate frequency signals $x_3$ and $x_4$ are sampled synchronously by the A–D converters 17, 18. The signal components with the different intermediate frequencies $f_{ZF1}$ and $f_{ZF2}$ can be separated by discrete Fourier transformation of the sampled signals $x_3$ and $x_4$ in block 19.

In FIG. 2b, a signal mixture $x_3$ is shown by way of example in the time domain with frequency components $f_{ZF1}=40$ kHz and $f_{ZF2}=60$ kHz. At right, the amount of the Fourier-transformed signal mixture is plotted over the intermediate frequency $f_{ZF}$. Two sharp signal peaks are shown in the respective intermediate frequencies. At other frequencies, the values of the spectrum are virtually zero. The different levels of the peaks result from different amplitudes of the signal components in the time domain (0.7 V, 0.4 V).

The values of the transformed signal mixture in the frequency domain are complex, i.e., it is composed of a real component and an imaginary component according to $$X_3(f_{ZF}) = Re\{X_3(f_{ZF})\} + j \cdot Im\{X_3(f_{ZF})\}.$$

FIG. 2 shows the following amount:

$$|X_3(f_{ZF})| = \sqrt{Im^2\{X_3(f_{ZF})\} + Re^2\{X_3(f_{ZF})\}}.$$

The phases of the separated signal components at the intermediate frequencies $f_{ZF1}$ and $f_{ZF2}$ in question can be determined from the complex values at the respective frequencies $f_{ZF1}$ and $f_{ZF2}$ by means of the arctan function according to $$\psi_1(f_1)=\arctan(Im\{X_3(f_{ZF1})\}/Re\{X_3(f_{ZF1})\})$$

and $$\psi_2(f_2)=\arctan(Im\{X_3(f_{ZF2})\}/Re\{X_3(f_{ZF2})\}).$$

For $x_3$ from equation (3), they are $$\psi_1(f_1)=\psi_{HS}(f_1)+\psi_{HE}(f_1)+\psi_{ZF3}(f_{ZF1})-2f_1 2D_0/c \quad (7)$$

and $$\psi_2(f_2)=\psi_{RS}(f_2)+\psi_{HE}(f_2)+\psi_{ZF3}(f_{ZF2})-2f_2 2D_3/c. \quad (8)$$

For the phases of $x_4$, it follows correspondingly from equation (4):

$$\psi_3(f_1)=\psi_{HS}(f_1)+\psi_{RE}(f_1)+\psi_{ZF4}(f_{ZF1})-2f_1 2D_1/c \quad (9)$$

and $$\psi_4(f_2)=\psi_{RS}(f_2)+\psi_{RE}(f_2)+\psi_{ZF4}(f_{ZF2})-2f_2 D_2/c. \quad (10)$$

It is particularly advantageous when the modulation frequencies $f_1$ and $f_2$ are exchanged in the next step, so that the main emitter 1 now emits radiation with modulation frequency $f_2$ and the reference emitter 2 emits radiation with modulation frequency $f_1$. As will be described subsequently, this measurement with exchanged modulation frequencies improves the definite distance measurement very substantially. According to the method described above, the following phases are measured:

$$\psi_1(f_2)=\psi_{HS}(f_2)+\psi_{HE}(f_2)+\psi_{ZF3}(f_{ZF2})-2f_2 2D_0/c \quad (11)$$

$$\psi_2(f_1)=\psi_{RS}(f_1)+\psi_{HE}(f_1)+\psi_{ZF3}(f_{ZF1})-2f_1 D_3/c \quad (12)$$

$$\psi_3(f_2)=\psi_{HS}(f_2)+\psi_{RE}(f_2)+\psi_{ZF4}(f_{ZF2})-2f_2 2D_1/c \quad (13)$$

$$\psi_4(f_1)=\psi_{RS}(f_1)+\psi_{RE}(f_1)+\psi_{ZF4}(f_{ZF1})-2f_1 D_2/c. \quad (14)$$

By subtraction, it follows from equations (7–14):

$$\psi_1(f_1)-\psi_3(f_1)=\psi_{HE}(f_1)-\psi_{RE}(f_1)+\psi_{ZF3}(f_{ZF1})-\psi_{ZF4}(f_{ZF1})-2f_1 2D_0/c+2f_1 2D_1/c \quad (15)$$

$$\psi_2(f_2)-\psi_4(f_2)=\psi_{HE}(f_2)-\psi_{RE}(f_2)+\psi_{ZF3}(f_{ZF2})-\psi_{ZF4}(f_{ZF2})-2f_2 D_3/c+2f_2 D_2/c \quad (16)$$

$$\psi_1(f_2)-\psi_3(f_2)=\psi_{HE}(f_2)-\psi_{RE}(f_2)+\psi_{ZF3}(f_{ZF2})-\psi_{ZF4}(f_{ZF2})-2f_2 2D_0/c+2f_2 2D_1/c \quad (17)$$

$$\psi_2(f_1)-\psi_4(f_1)=\psi_{HE}(f_1)-\psi_{RE}(f_1)+\psi_{ZF3}(f_{ZF1})-\psi_{ZF4}(f_{ZF1})-2f_1 D_3/c+2f_1 D_2/c, \quad (18)$$

and, finally, by subtracting equations (15), (18) and (16), (17), it follows:

$$\psi(f_1)=2f_1 2D_1/c-2f_1 D_2/c+2f_1 D_3/c-2f_1 2D_0/c+2n \quad (19)$$

$$\psi(f_2)=2f_2 2D_1/c+2f_2 D_2/c-2f_2 D_3/c+2f_2 2D_0/c-2n \quad (20).$$

Since the phase can only be definitely measured in an interval of 0 to 2, but the measurement distance in most cases produces substantially larger phase shifts, the integral number n of the full cycles which, in addition to the residual phase term, determines the total phase rotation is introduced in equations (19) and (20). The distance $D_0$ to be measured and the number of cycles n can now be definitely determined from the last two equations (19) and (20), since the distances $D_1$, $D_2$ and $D_3$ internal to the device are constant and can be determined beforehand by measurement technique. The two modulation frequencies $f_1$ and $f_2$ should lie close enough together that the same number of cycles n results for both equations (19) and (20). This ambiguity of the measurement distance is the reason for exchanging the modulation frequencies according to the teaching of patent claim 2, because the additional measurement with exchanged frequencies supplies the additional equation (20) which is independent from equation (19). These two independent equations also supply definite values for n and $D_0$ with large measurement distances $D_0$.

Another advantage of the additional measurement with exchange of frequencies is that the main receiver phases and reference receiver phases ($\psi_{HE}(f_1)$, ($\psi_{HE}(f_2)$, ($\psi_{HE}(f_1)$, ($\psi_{HE}(f_2)$)) and the phases of the intermediate frequency range can be completely eliminated as can be seen in equations (17) and (18). This is achieved by subtracting equations (15) and (18) and equations (16) and (17).

The phase differences on the respective left-hand side of equations (19) and (20) result from the phase measurement.

A smaller frequency difference $f_1$-$f_2$ (e.g., several hundreds of kHz, with $f_1$=900 MHz) is desired on the one hand in order to definitely determine the integral number of cycles n (the same n in equations (19) and (20)) at large measurement distances (e.g., >100 m). On the other hand, with smaller frequency differences there are greater measurement errors caused by noise, so that n is incorrectly determined under certain conditions.

For more exact measurement of large distances and, at the same time, accurate determination of the number of cycles n, it is advantageous to use a second frequency pair $f_3$ and $f_4$ for intensity modulation in a further measurement pass which differs from $f_1$ and $f_2$, for example, by 10 MHz. The procedure mentioned above is carried out again with this frequency pair, wherein no exchange is required because the exact distance measurement is carried out with frequency pair $f_1$ and $f_2$. Due to the larger frequency difference (e.g., $f_3$-$f_1$=10 MHz), a possible measurement error is further reduced and the integral cycle number n can also be definitely determined with very large measurement distances. By means of this step, indicated in patent claim 18, which consists in a uniform, small change in the intensity modulation frequencies, distance and cycle number can be determined without errors with weak, noisy measurement signals through the use of another frequency pair, e.g., $f_1$–10 MHz, $f_2$–10 MHz. In addition, by changing the measurement frequencies, optimum-operating points can be found which result in optimal signal-to-noise ratios. Due to the tolerances of bandpass filters, these optimal frequencies may differ slightly from one device to the other.

The method according to the invention and the distance measurement device based on this method are distinguished, above all, by the following advantages:

All phase errors are eliminated by simultaneous measurement of the reference emitter signal and the main emitter signal. Therefore, all phase errors dependent upon temperature, aging and reception power in the transmitting unit and reception unit are completely eliminated.

Measurement accuracy is substantially improved.

The reliability of measurements is appreciably improved.

The measurement device does not require maintenance to a great extent because no mechanical changeover switches or the like are required.

The measurement time is reduced and the measurement accuracy is increased by the simultaneous measurement of the reference emitter signal and main emitter signal.

What is claimed is:

1. A method for optoelectronic measuring the distance of a measurement object from an observation point, comprising the steps of:

directing a main light beam intensity-modulated with a first modulation frequency and emitted by a main light emitter to a measurement object at a distance;

receiving scattered light at the observation point at a main photoreceiver via reception optics, simultaneously directing a branched part of the main light beam to a reference photoreceiver via a first known reference distance ($D_1$);

simultaneously receiving at the reference photoreceiver via a second known reference distance ($D2$) a reference light beam intensity-modulated with a second modulation frequency different from said first modulation frequency and emitted by a reference light emitter;

receiving part of the reference light beam at the main photoreceiver via a third reference distance ($D_3$);

subjecting the signals delivered by the main photoreceiver and the reference photoreceiver to a comparative signal evaluation for obtaining a corrected measurement signal converting signal mixtures supplied by the main photoreceiver and the reference photoreceiver to an intermediate frequency range containing two frequency components, wherein each of the signal mixtures contains a signal component with an intensity modulation frequency of the main light emitter and a signal component with an intensity modulation frequency of the reference photoreceiver and wherein one frequency component is formed by the signal of the reference light emitter and the other frequency component is formed by the signal of the main light emitter;

basing separation of phase information contained in two simultaneously occurring intermediate frequency signals on different frequencies in the intermediate frequency range and the different modulation frequencies for the intensity modulation of the main light beam and reference light beam, for purposes of comparative signal evaluation;

successively carrying out a plurality of measurement processes to achieve a definite distance measurement and to improve measurement results;

exchanging the first and the second modulation frequencies for the intensity modulation of said main light beam one against the other, and equally changing the modulation frequencies for said two light beams according to a set pattern.

2. The method of claim 1, further comprising the step of varying the delivery power of at least one of the main light emitter and the reference light emitter for adapting to different dynamic requirements.

3. The method according to claim 1, wherein the main light emitter comprises a first laser and the reference light emitter comprises a second laser.

4. The method of claim 3, further comprising the step of selecting different fundamental wavelengths ($F_{ZF1}$, $F_{ZF2}$) for the first and second lasers.

5. The method of claim 4, further comprising the step of reducing the crosstalk between the light signal paths associated with the main light beam and reference light beam by optical filtering.

6. The method according to claim 3, further comprising the steps of determining the phases of the signal components of the signal mixtures in the intermediate frequency range using digital Fourier transformation and evaluating the real and imaginary parts of the Fourier-transformed signal mixtures in the frequency domain at the respective intermediate frequencies ($f_{ZF1}$ and $f_{ZF2}$) for purposes of comparative signal evaluation.

7. The method of claim 6, further comprising the step of subjecting the signal mixtures to be supplied to the digital Fourier transformation to a low-pass filtering.

8. The method of claim 7, further comprising the step of selecting the intermediate frequencies ($f_{ZF1}$ and $f_{ZF2}$) and the sampling times, of an analog-to-digital conversion preceding the Fourier transform, such that an integral number of cycles of the signal component with the first intermediate frequency ($f_{ZF1}$) and the signal component with the second intermediate frequency ($f_{ZF2}$) lie in the measurement window of the digital sampling.

9. The method according to claim 1, further comprising the steps of initially diffusely scattering the component of the reference light beam reaching the main photoreceiver and guiding the diffusely scattered component to the main photoreceiver only as a scattered component together with the backscattered component of the main light beam impinging via the reception optics.

10. The method according to claim 1, further comprising the steps of initially diffusely reflecting the component of the reference light beam reaching the main photoreceiver and guiding the diffusely reflected component to the main photoreceiver only as a scattered component together with the backscattered component of the main light beam impinging via the reception optics.

11. The method according to claim 1, further comprising the steps of initially diffusely scattering the component of the reference light beam and main light beam reaching the reference photoreceiver and guiding the diffusely scattered components to the reference photoreceiver only as a scattered light components.

12. The method according to claim 9, further comprising the steps of initially diffusely scattering the component of the reference light beam and main light beam reaching the reference photoreceiver and guiding the diffusely scattered components to the reference photoreceiver only as a scattered light components.

13. A device for optoelectronic distance measurement with two light transmitters (1,2) each emitting a light beam that is intensity-modulated with a first frequency ($f_1$) for a first one (1) of said transmitters and a second frequency ($f_2$) for a second one (2) of said transmitters;

wherein the light beam of the first light transmitter is a main light emitter directable to a measurement object at a distance;

a distance ($D_0$) of the measurement object from an observation point is to be measured;

a separated portion of the light beam of the main light emitter reaches one of two photoreceivers including a reference photoreceiver via a first reference distance ($D_1$);

wherein the light beam of the second light transmitter reaches the reference receivers via a second reference distance ($D_2$) and beam component separated from the light beam of the second light transmitter reaches the second one of said photoreceivers being a main photoreceiver via a third reference distance ($D_3$);

wherein the main photoreceiver is acted upon by a component of the light beam of the main light emitter backscattered from the measurement object;

wherein the reference photoreceiver and the main photoreceiver are each associated with a signal mixer;

a receiver signal mixer being transformed into an intermediate frequency range;

an evaluating device for determining the measurement distance ($D_0$) from the output signals of the mixer; of the reference photoreceiver and the mixer of the main photoreceiver and wherein a device by which the light beams emitted by the main light emitter and reference light emitter is simultaneously intensity-modulated with different frequencies ($f_1$, $f_2$).

14. The device of claim 13, wherein at least one of a transimpedance amplifier and impedance-monitored HF amplifier is arranged between at least one of the reference photoreceiver and the main photoreceiver and the respective associated mixer.

15. The device of claim 13, wherein at least one the main photoreceiver and the reference photoreceiver is an avalanche photodiode.

16. The device of claim 15, wherein the avalanche photodiode is implemented as a direct mixer, wherein a reception signal mixture is converted directly into the intermediate frequency range by modulation of the avalanche gain via a local oscillator signal ($f_{10}$) generated by a local oscillator.

17. The device of claim 16, wherein the local oscillator is an LC oscillator, the oscillation-determining elements of the LC oscillator being formed by the capacity of the avalanche photodiode.

18. The device of claim 13, wherein at least one of the main photoreceiver and the reference photoreceiver is a PIN photodiode.

19. The device of claim 13, wherein device is present in the intensity modulation device for mutual exchange of frequencies ($f_1$, $f_2$) of the modulation signals reaching the respective light emitter.

20. The device of claim 19, wherein the device is used for time-sequential mutual exchange of the frequencies of the intensity modulation signals reaching the respective light emitter.

21. The device of claim 19, wherein the device is used for uniformly changing the frequency of the intensity modulation signals reaching the respective light emitter.

22. The device of claim 13, wherein a scattering device is arranged in the beam path of a beam component traveling from the reference light emitter to the main light receiver and wherein a scattered light component of the beam component proceeding from the reference light emitter travels from the scattering device to the main photoreceiver.

23. The device of claim 13, wherein a scattering device is arranged in the beam path of beam components traveling from the reference light emitter and from the main light emitter to the reference photoreceiver and wherein scattered light components of the beam components proceeding from the reference light emitter and main light emitter travel from the scattering device to the reference photoreceiver.

24. The device of claim 13, wherein the device varies the light output of at least one of the reference light emitter and the main light emitter.

25. The device of claim 13, wherein the optical wavelengths ($\lambda_1$, $\lambda_2$) of the reference light emitter and the main light emitter are different.

26. The device of claim 25, wherein at least one of (i) an optical filter tuned to the wavelength emitted by the main light emitter is arranged in the beam path from the main light emitter to the reference photoreceiver and (ii) an optical filter tuned to the wavelength emitted by the reference emitter is a ranged in the beam path from the reference emitter to the main receiver.

27. The device of claim 26, wherein at least one of the main light emitter and the reference light emitter is one of n edge emitting laser diode, a VCSEL (Vertical Cavity Surface Emitting Laser Diode) and light diode.

28. The device of claim 13, further comprising a mother oscillator to be used for both the transmitting part and reception part.

29. The device of claim 13 or claim 16, wherein the two mixers are controllable by the same local oscillator with a frequency ($f_{LO}$) selected such that there is a signal mixture present in the intermediate frequency range whose signal components with both intermediate frequency components ($f_{ZF1}$, $f_{ZF2}$) contain phases in the modulation frequencies ($f_1$, $f_2$).

* * * * *